(12) United States Patent  
Reyero et al.

(10) Patent No.: US 7,255,413 B2
(45) Date of Patent: Aug. 14, 2007

(54) METHOD OF ADJUSTING PRINTING RESOLUTION TO AVOID CONDITIONS OF POOR PEN PERFORMANCE IN AN INKJET PRINTING SYSTEM, AND SYSTEMS

(75) Inventors: Santiago Garcia Reyero, San Diego, CA (US); Cesar Fernandez, San Diego, CA (US); Robert F. Little, Escondido, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 11/047,075

(22) Filed: Jan. 31, 2005

(65) Prior Publication Data

US 2006/0170716 A1 Aug. 3, 2006

(51) Int. Cl.
*B41J 2/205* (2006.01)
*B41J 29/38* (2006.01)
*G06K 9/32* (2006.01)
*G06K 15/02* (2006.01)

(52) U.S. Cl. ............... 347/15; 347/5; 358/1.2; 382/299

(58) Field of Classification Search ............ 347/15; 358/1.2; 382/299
See application file for complete search history.

(56) References Cited

U.S. PATENT DOCUMENTS

| | | | | |
|---|---|---|---|---|
| 5,689,343 | A * | 11/1997 | Loce et al. | 358/3.21 |
| 6,390,586 | B1 * | 5/2002 | Takahashi et al. | 347/19 |
| 6,502,915 | B1 * | 1/2003 | Feinn et al. | 347/12 |
| 6,631,964 | B2 * | 10/2003 | Askeland et al. | 347/15 |
| 6,932,453 | B2 * | 8/2005 | Feinn et al. | 347/12 |
| 7,140,710 | B2 * | 11/2006 | Marra et al. | 347/15 |

* cited by examiner

*Primary Examiner*—Stephen Meier
*Assistant Examiner*—Rene Garcia, Jr.

(57) ABSTRACT

Exemplary embodiments of the invention include methods of adjusting the print resolution of an inkjet printhead having a region of poor performance such that printing occurs outside the region of poor performance. Exemplary embodiments also include systems utilizing the methods.

25 Claims, 7 Drawing Sheets

METHOD OF ADJUSTING PRINTING RESOLUTION TO AVOID CONDITIONS OF POOR PEN PERFORMANCE IN AN INKJET PRINTING SYSTEM, AND SYSTEMS

FIELD OF INVENTION

This invention relates generally to methods of minimizing print quality defects in industrial printing.

BACKGROUND

Inkjet printers are well known in the art. Small droplets of liquid ink, propelled by thermal heating, piezoelectric actuators, or some other mechanism, are deposited by a printhead on a print media, such as paper. By depositing a succession of drops on the print media, text and images are formed.

Inkjet printheads, or "pens", are typically manufactured in a manner similar to the manufacture of semiconductor integrated circuits. The ink ejection mechanisms, or "nozzles", are typically formed in a linear array, with ink feed paths formed through the printhead to provide the nozzles with ink. A limitation on the print speed for a given printhead design is the rate at which successive drops can be "fired" from a nozzle, which is primarily determined by the fluid refill time of the ink ejection mechanism.

Inkjet pens are complex mechanisms. The rapid refill of the nozzle firing chambers involves factors such as the momentum of the ink, surface tension, and the geometry of the fluidic channels. A given inkjet pen design may work well at some points within its operating range and less well at others. The printhead design may, for example, be optimized such that there are broad "resonances" in the ink channels and firing chambers that may be advantageous to the rapid refill of the firing chambers, but which have adverse affects under some conditions. A design that is optimized to provide a high maximum firing rate (and thus a fast print speed) may produce a poor print quality or prove unreliable at slower, non-optimum print rates.

One problem sometimes encountered is termed "puddling", where the geometry of the ink refill paths and the momentum of the ink flowing through the paths cause ink to spill out of the firing chambers and onto the printhead orifice plate. The presence of the "puddles" on the orifice plate can cause ink drops fired from nearby firing chambers to land off target, and other printing problems.

In scanning-carriage inkjet printing systems, such are typically used in homes and offices, inkjet printheads are typically mounted on a carriage that is moved back and forth across the print media. As the printheads are moved across the print media, a control system activates the printheads to deposit or eject ink droplets onto the print media to form text and images. The print media is generally held substantially stationary while the printheads complete a "print swath"; the print media is then advanced between print swaths. Because scanning carriage systems can control all facets of the printing process, including the pen firing rate, the carriage speed across the media, and the paper advance rate, the printers can be designed with defined print modes that avoid any problematic areas in the printhead operating range.

In many industrial applications, such as the printing of labels or barcodes on a production line, the required printing rate may be dictated by external factors other than the preferred operating point of the printhead, such as, for example, the rate at which items progress down the production line. In such applications, it is advantageous that the printer be able to print acceptably at whatever rate is required by the external factors. It is also economically desirable to be able to utilize existing, readily-available inkjet pens in many industrial applications, rather than specialized, high cost designs.

There is thus a need for methods that allow an industrial inkjet printer pens to adaptably print at various rates while avoiding areas of poor performance.

SUMMARY

Exemplary embodiments of the invention include methods of adjusting the print resolution of an inkjet printhead having a region of poor performance such that printing occurs outside the region of poor performance. Exemplary embodiments also include systems utilizing the methods.

Other aspects and advantages of the present invention will become apparent from the following detailed description, taken in conjunction with the accompanying drawings, illustrating by way of example the principles of the invention.

DESCRIPTION OF EMBODIMENTS OF THE INVENTION

Embodiments of the invention are described with respect to an exemplary inkjet printing system; however, the invention is not limited to the exemplary system, but may be utilized in other systems.

In the following specification, for purposes of explanation, specific details are set forth in order to provide an understanding of the present invention. It will be apparent to one skilled in the art, however, that the present invention may be practiced without these specific details. Reference in the specification to "one embodiment" or "an exemplary embodiment" means that a particular feature, structure, or characteristic described in connection with the embodiment is included in at least one embodiment. The appearance of the phrase "in one embodiment" in various places in the specification do not necessarily refer to the same embodiment.

Figure 1:
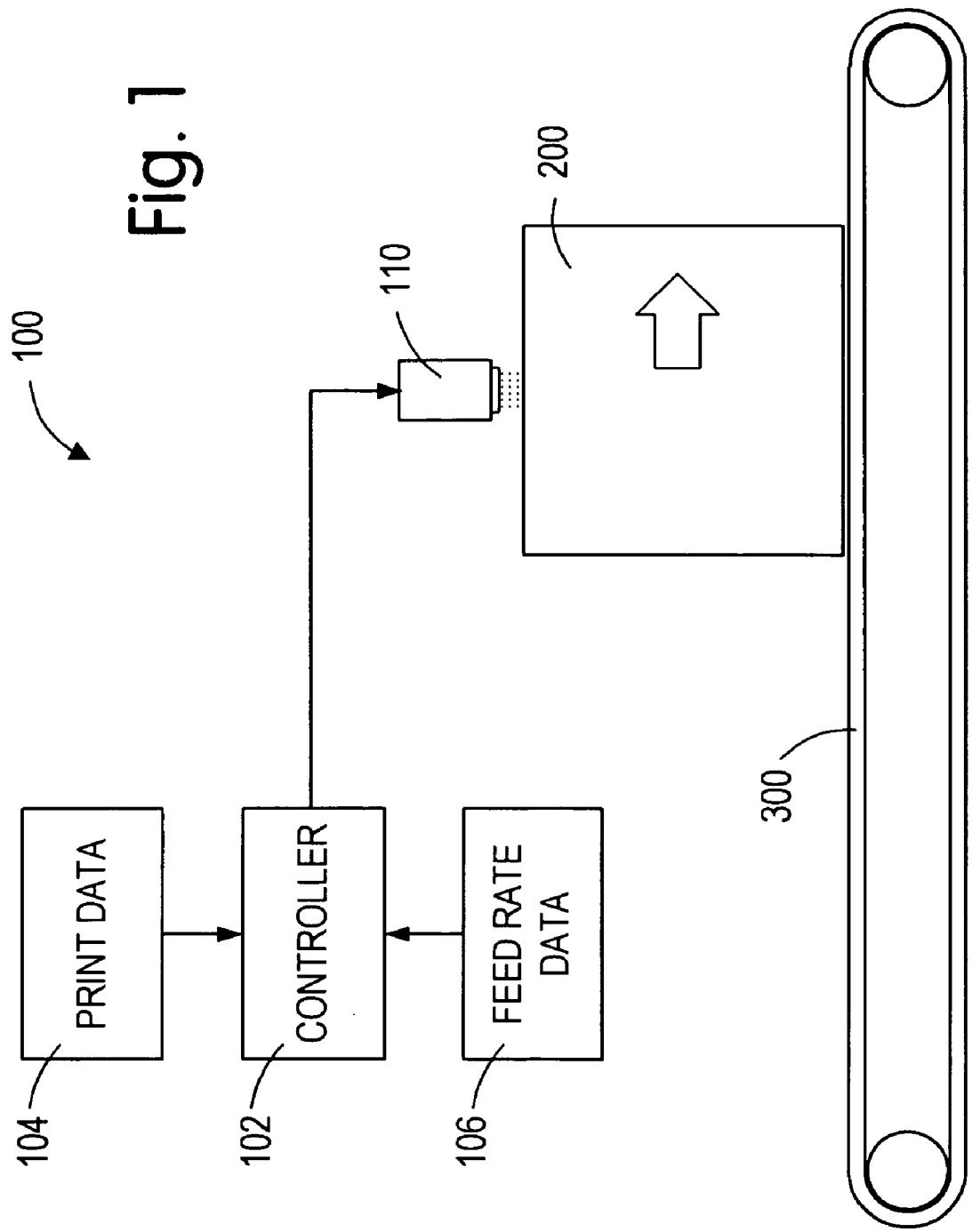
FIG. 1 illustrates an exemplary industrial inkjet printing system in which embodiments of the invention may be utilized.

FIG. 1 illustrates an exemplary industrial inkjet printing system 100 in which embodiments of the invention may be utilized. As schematically illustrated in FIG. 1, a target item 200 is moved past a fixed printhead 110 by a conveyance system 300. The printhead fires at the appropriate time to mark the target item. Such a system may be utilized, for example, to print labels, barcodes, dates, or routing and shipping information on goods traveling down an assembly or processing line.

The printhead 110 is controlled by a controller 102. The controller processes both print data 104 and data relating to the feed rate 106 of the target item to develop the appropriate firing controls for the printhead. Typically external factors dictate the feed rate of the item past the printhead, such that the controller must adjust the print rate to fit the feed rate. In many industrial printing situations, the printer does not control the paper speed, but is integrated on top of an existing feed path.

The "firing rate" ("FR") for an inkjet pen is dependent on the resolution (dots per inch) of the printed output, and the rate at which the pen and print media move in relation to one another (which, for an exemplary industrial application, is the rate at which the target is "fed"):

$$FR \text{ [kHz]} = \frac{\text{Feed Rate [feet/minute]} \times [12 \text{ inches/foot}]}{[60 \text{ seconds/minute}]} \times \frac{\text{Resolution [dots/inch]}}{1000} \quad \text{[eq. 1]}$$

Figure 2:
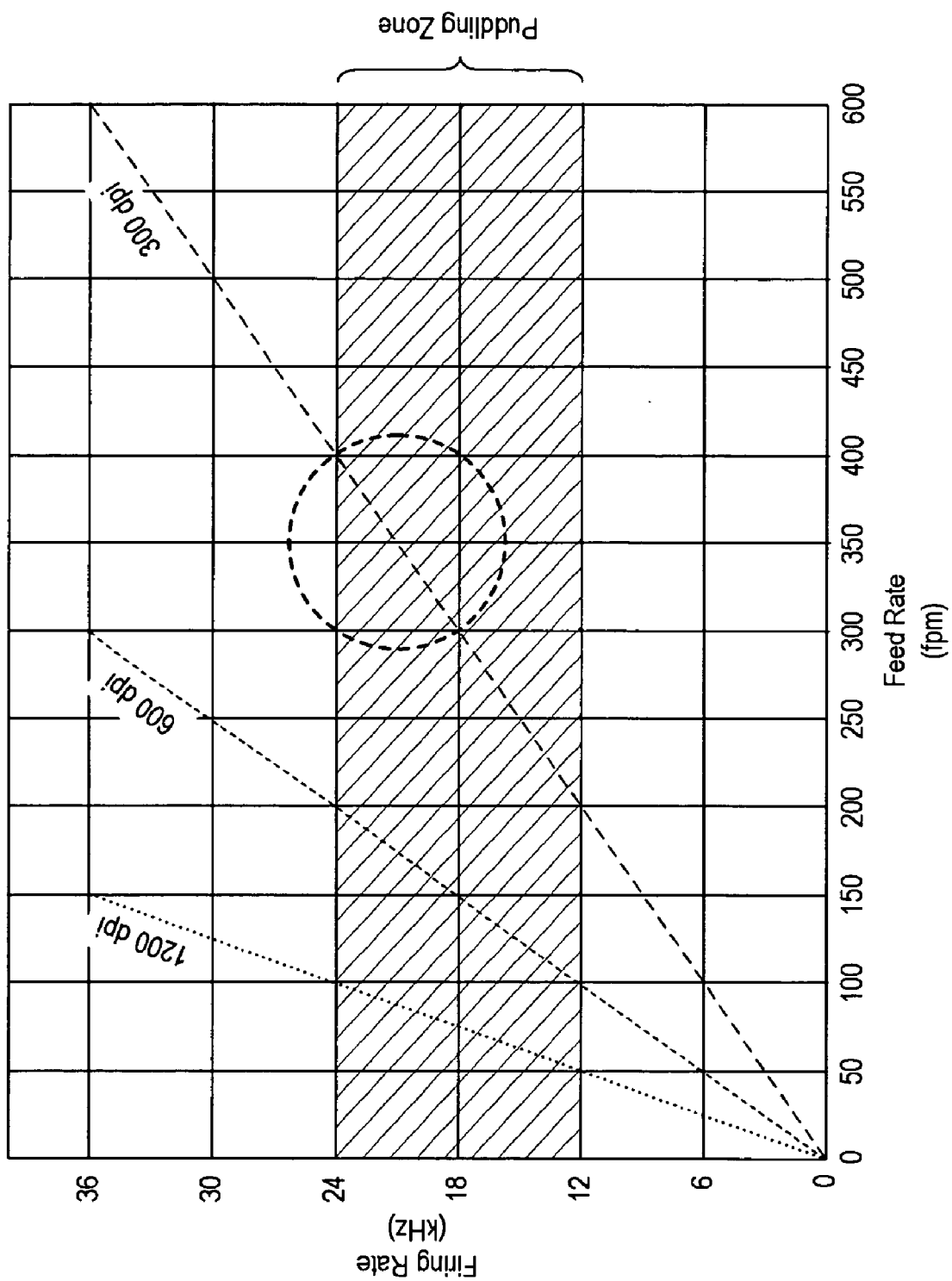
FIG. 2 graphically illustrates how some media feed rates may require operation of an exemplary printhead within a region of poor performance.

In typical scanning carriage inkjet printing systems, the pen will be operated at a small number of print resolutions, such as, for example, 300, 600, and 1200 dots per inch (dpi), depending on the print quality and print speed desired ("draft" mode may use 300 dpi for increased speed; "best" mode would use 1200 dpi). FIG. 2 illustrates the required firing rates for an exemplary inkjet pen at 300, 600, and 1200 dpi for an exemplary inkjet pen as a function of feed rate. In an exemplary system, the area of the graph between 12 kHz and 24 kHz firing rates, shown in cross-hatch, is a zone in which the pen functions poorly due to "puddling" (or some other phenomenon). The "puddling zone" does not in reality have the absolute fixed boundaries as shown in FIG. 2; puddling may occur to a lesser degree with firing rates slightly outside the puddling zone. In general it is best to print at firing rates well outside the puddling zone.

It may be observed in FIG. 2 that the three standard print resolutions do not allow printing at all possible feed rates while at the same time avoiding the puddling zone. For example, feed rates between 300 feet per minute (fpm) and 400 fpm must be printed at 300 dpi, at firing rates between 18 kHz and 24 kHz (as indicated by the dashed circle). While a scanning carriage printing system can typically utilize defined print modes that avoid printing at these feed (or "scan") rates, an industrial printing application must typically be able to accommodate all feed rates within it's operating range without significant print quality defects.

Figure 3:
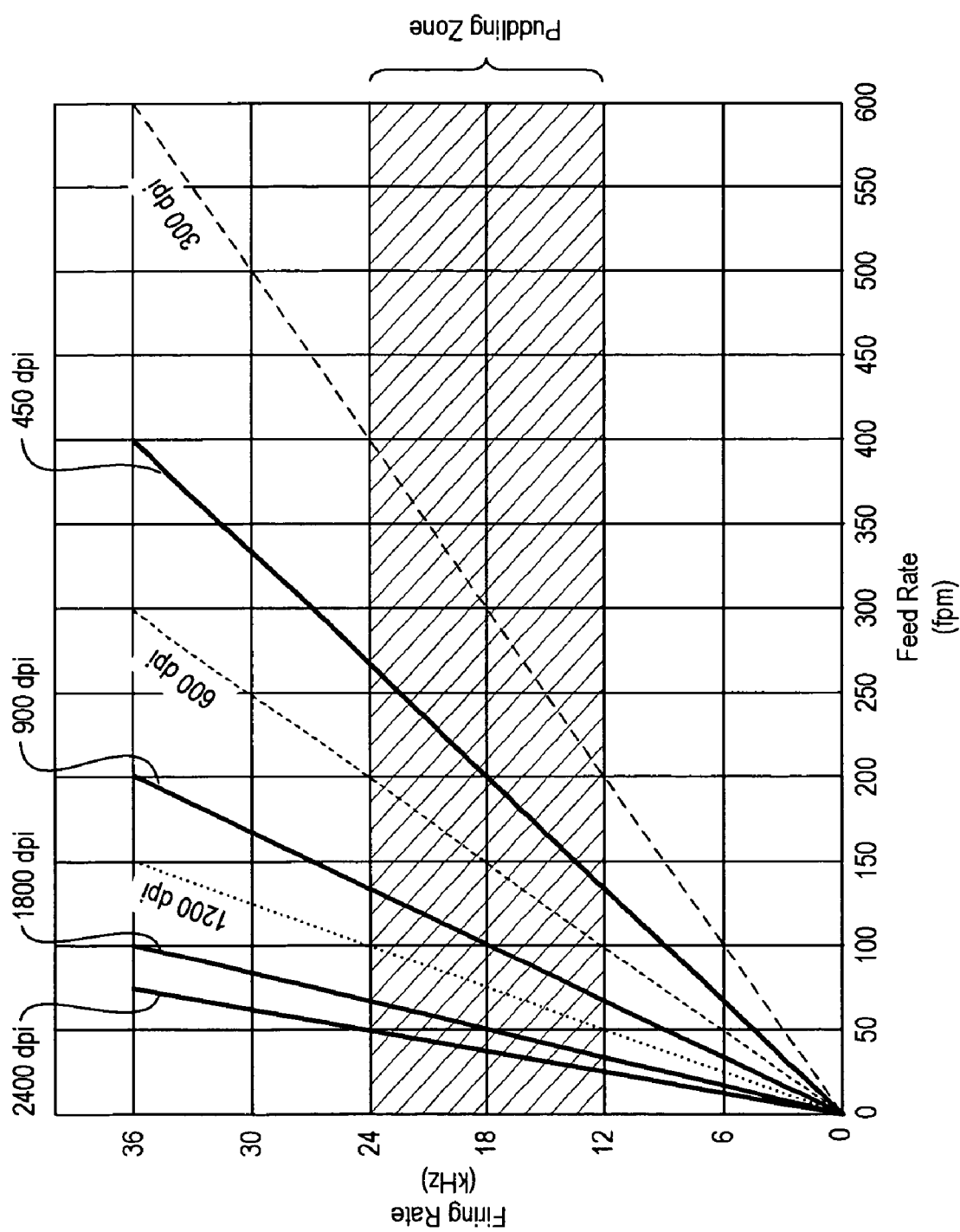
FIG. 3 graphically illustrates how additional print resolutions may be defined such that printhead operating points are available outside the region of poor performance of the exemplary printhead.

Embodiments of the invention thus first define a set of printing resolutions such that the resolutions always overlap within the desirable printing range, as shown in FIG. 3. The resolutions are preferably selected such that they are obtainable using multiples of a common encoder, such as a 150 dpi encoder:

TABLE 1

| multiplier | resolution |
| --- | --- |
| 2 | 300 |
| 3 | 450 |
| 4 | 600 |
| 6 | 900 |
| 8 | 1200 |
| 12 | 1800 |
| 16 | 2400 |

Embodiments of the invention thus typically determine the feed rate of the target object and, based upon the feed rate, select a print resolution that falls appropriately outside the puddling zone. In general, an operating point will be selected such that the required firing rate is comfortably outside the puddling zone, such as either well below 12 kHz or well above 24 kHz.

Once a new print resolution is selected the original print data must be resealed such that the resulting printed image has the correct height to width ratio. In scaling the data to the new print resolution, two factors come into play. First, it is desirable that the resulting printed image have the correct optical density, meaning that the approximate number of drops per unit area of the original data is substantially preserved. Second, in scaling the data, the puddling zone of the pen must be avoided. The second factor is of concern because a simple "spreading out" of the data to preserve the optical density would in many cases effectively move the pen back into the puddling zone.

Figure 4:
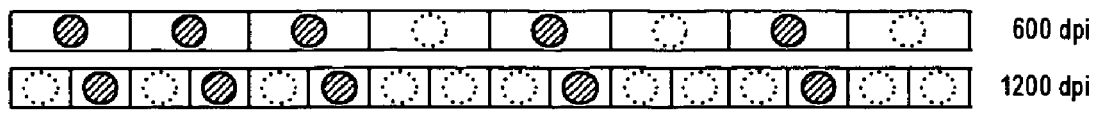
FIG. 4 illustrates how linearly upscaling print data to a higher print resolution does not alone move the operating point of an exemplary printhead out of the region of poor performance.

FIG. 4 illustrates how merely linearly scaling up the resolution of the print data while maintaining the same optical density (the same number of drops per area) does not move the operating point of the printhead out of the puddling zone. FIG. 4 is intended to illustrate a sample sequence of print drops, highly magnified, with the actual deposited drops shown as filled circles, and unfired drop positions (positions where the print resolution would allow a drop, but the print data dictates that no drop be deposited) as dashed circles. Although the 1200 dpi data has twice as many potential drop positions, the actual drops fired are essentially the same as the 600 dpi data. If the printhead is within the puddling zone when printing the 600 dpi data, it will also be in the puddling zone when printing the 1200 dpi data.

The image printed with the upscaled data must have approximately the same optical density as the original "base" data but must also avoid printing in the puddling zone. Exemplary embodiments of the resealing algorithm involve printing the same number of drops as in the original print resolution (it may be noted that the printhead nozzles print the same quantity of ink, or "drop weight", per drop, regardless of the resolution), while slightly re-ordering the occurrence of drops and "blanks" such that the nozzles are not firing within the puddling zone. Scaling to a higher resolution essentially creates the "blank" spaces to which drops may be shifted. The method may also be viewed as slightly shifting in the time certain nozzle firings within a sequence, such that the broad resonances of the ink channel geometries are avoided, similar to the manner in which soldiers marching across a suspension bridge will "break step" to avoid the resonances of the bridge.

Printing at a firing rate well outside the puddling zone and resealing the data with the exemplary algorithm will result in the same total number of drops being "fired", but with a slight, substantially imperceptible, shift of some drops. The small impact on print quality is generally much preferable to the degradation due to printing within the puddling zone.

Figure 5A:
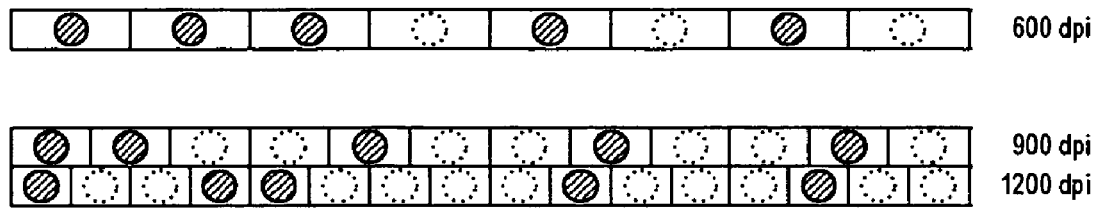
FIGS. 5(a), 5(b), and 5(c) illustrate exemplary print sequences according to an embodiment of the invention.

FIG. 5(a) shows an illustrative example of an exemplary upscaling algorithm applied to 600 dpi data upscaled to 900 dpi and 1200 dpi. The exemplary algorithm insures that the upscaled print data always (1) has two consecutive drops (e.g., the drops are contiguous), or (2) has at least two "empty" spaces, or non-firing times, between actual drops. It can be seen that in both the 900 dpi and 1200 dpi upscalings, the deposited drop positions align relatively well with the positions.

Figure 5B:
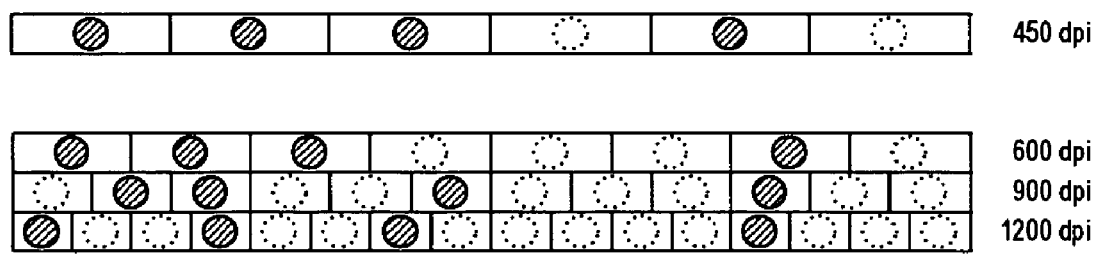
Figure 5C:
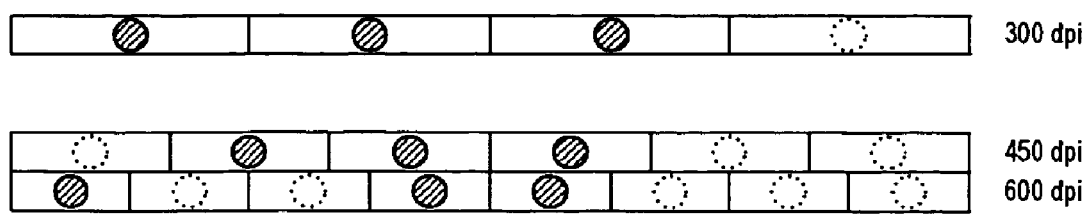

FIG. 5(b) illustrates 450 dpi print data upscaled using the exemplary algorithm to 600, 900, and 1200 dpi, and FIG. 5(c) illustrates 300 dpi print data scaled to 450 and 600 dpi. While scaling to a resolution that is not an integer multiple of the base resolution appears to cause greater misalignment, the actual impact on print quality is substantial less than using the printhead in the puddling zone.

Variations of the exemplary algorithm may also be employed. In other printing systems, other potential print defects may exist, due to puddling or other phenomena, and different regions of the operating range of the printhead may be impacted. Algorithms may take a different or more complex form, so long as the additional print resolution provided by upscaling is utilized to modify the position of individual drops to avoid regions of poor performance.

Figure 6:
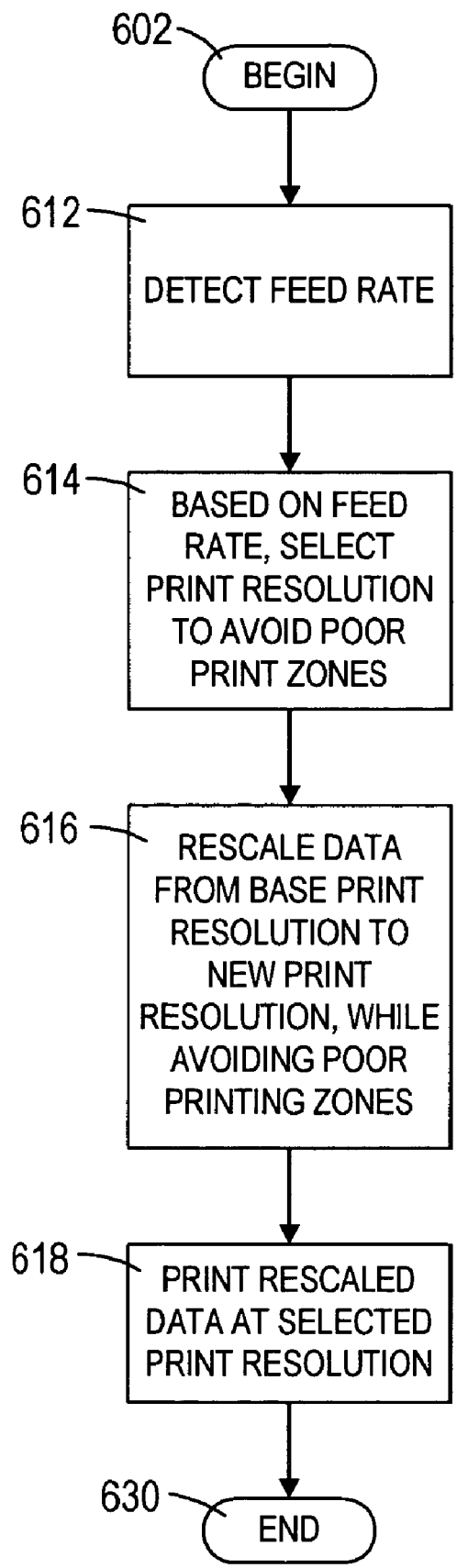
FIG. 6 is a flow chart further illustrating the steps of an exemplary embodiment of the invention.

FIG. 6 is a flowchart summarizing the steps of an embodiment of the method of the present invention. The method begins 602 with the controller determining the feed rate 612 of the target item; the controller may receive information from external sensors, external computer or control systems, or the information may be "hard wired" into the controller hardware, firmware, or software. Based on the feed rate, the controller than selects, if necessary, a rescaled print resolution that is outside the of the region of poor performance 614 (in many situations, base print resolution may be acceptable, and thus no resealing or re-ordering of the data is required). The controller rescales the data 616 utilizing an appropriate algorithm to avoid the area of poor performance. The resealed data is then printed 618, and the exemplary method ends 630.

Figure 7:
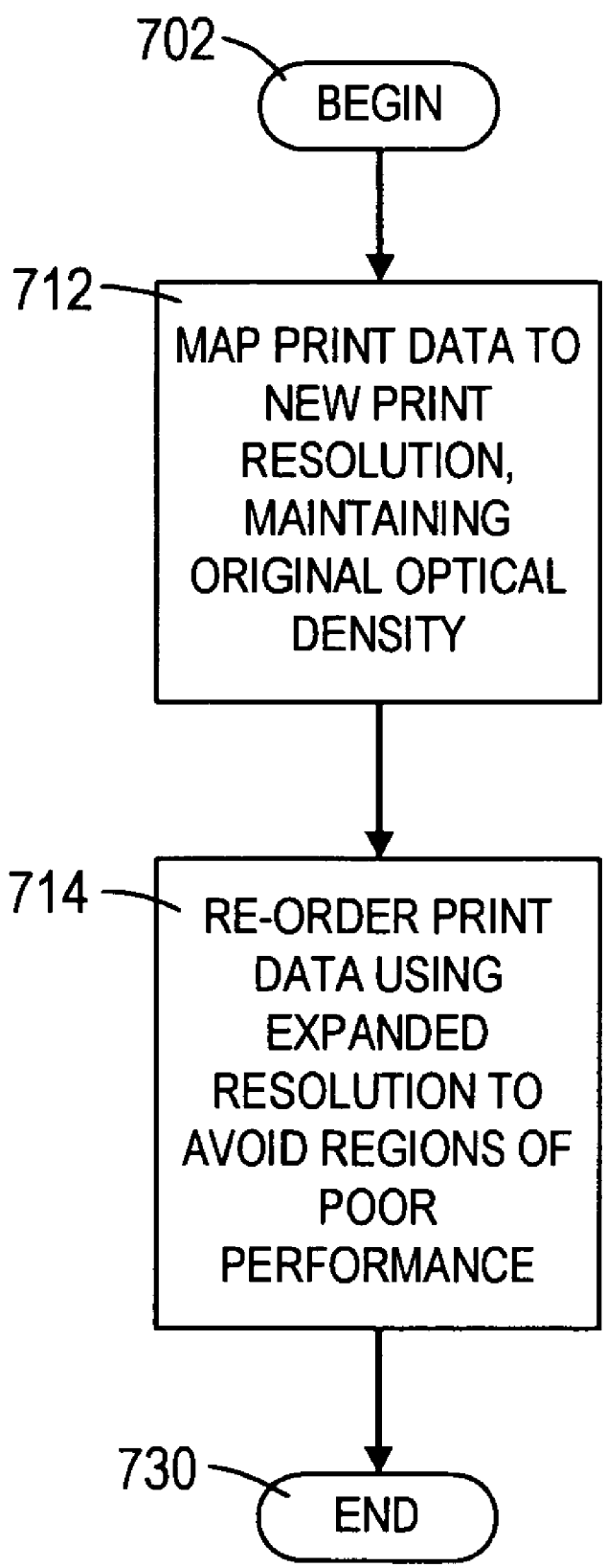
FIG. 7 further illustrates how data is rescaled from a base print resolution to a new print resolution, while avoiding poor printing zones, according to an embodiment of the invention.

FIG. 7 further illustrates how data is rescaled from a base print resolution to a new print resolution, while avoiding poor printing zones, according to an embodiment of the invention. The resealing begins 702 and the original "base" print data is first mapped to a new, higher resolution 712, while substantially maintaining the original optical density. At the higher resolution, since essentially the same number of drops are to be printed as with the "base" resolution, additional "unused" slots or drop firing times are available; this additional resolution allows the upscaled print data to be re-ordered, with drops moved slightly in time, to avoid areas of poor performance 714; and the resealing ends. In an exemplary algorithm, avoiding areas of poor performance involves (1) insuring that drops are fired contiguously, or, if not, that (2) at least two blank "non firing" intervals occur between drops.

Figure 8:
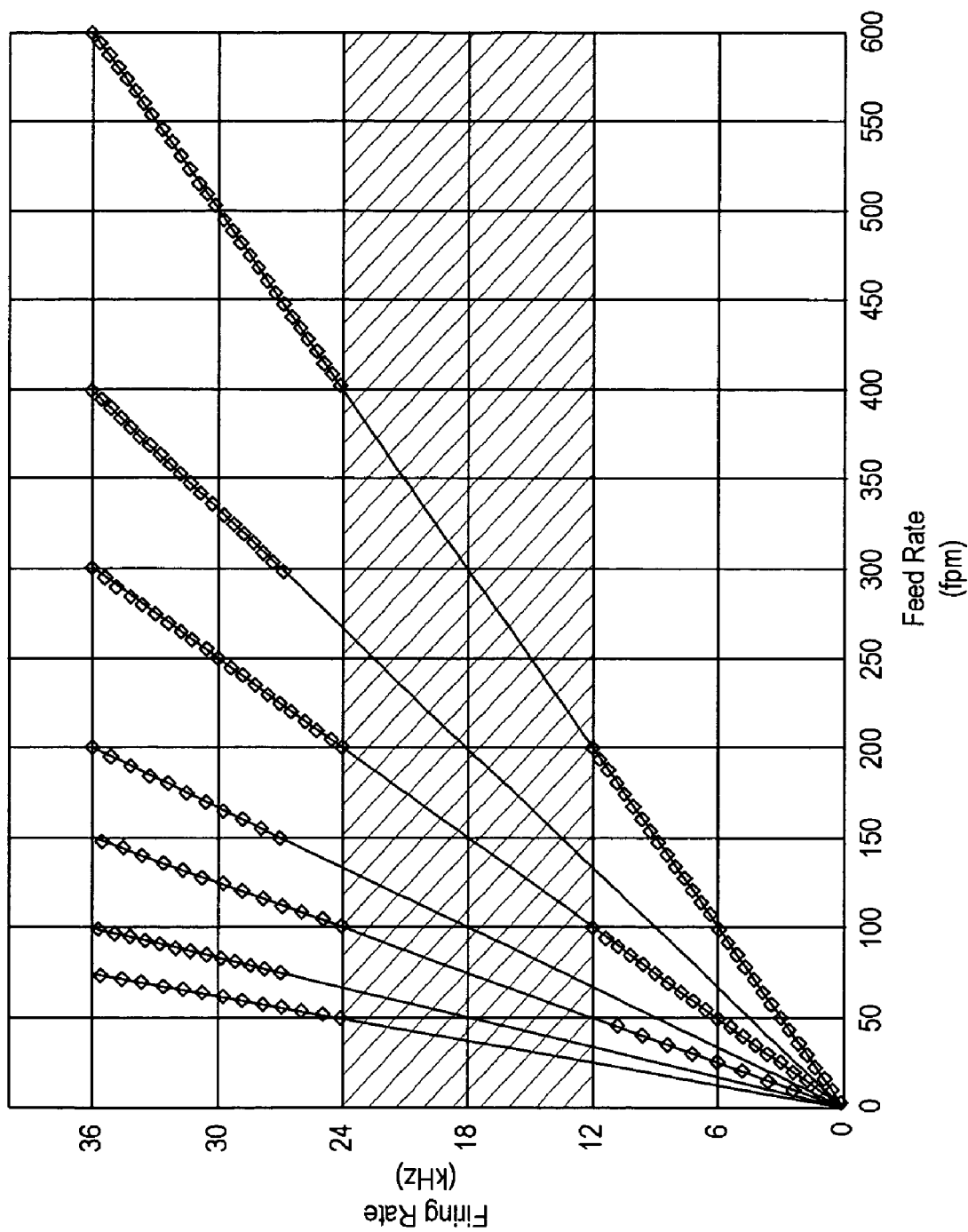
FIG. 8 depicts the feed rates and firing rates provided by an exemplary embodiment of the invention.

FIG. 8 depicts the feed rates and firing rates provided by an exemplary embodiment of the invention. As seen in FIG. 8, the diamonds on the graph identify actual operating points achieved using an embodiment of the invention. It may be observed that at many feed rates multiple resolutions may be used, and that in general it is possible to print at any feed rate substantially outside of the region of poor performance (12 kHz to 24 kHz in the embodiment illustrated).

Embodiments of the invention may also be characterized as (1) identifying a range of firing rate frequencies at which print defects occur; and (2) modifying the spacing apart of successive drops ejected by a nozzle such that the inverse of the time interval between successive drops (which may be considered the instantaneous firing rate) does not fall within the undesirable range. The "disfavored" firing rates that result in puddling or some other print defect are thus avoided. Scaling the print data to a higher print resolution allows this to be done while utilizing components of a standard printing system, such as the Application Specific Integrated Circuits (ASICs).

While exemplary embodiments have been described with respect to stationary printheads such as might be utilized in an industrial printing environment, the invention may also be advantageously applied in other printing systems, including scanning carriage printing systems.

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

The corresponding structures, materials, acts, and equivalents of all means or step plus function elements in the claims below are intended to include any structure, material, or acts for performing the functions in combination with other claimed elements as specifically claimed.

What is claimed is:

1. A method of adjusting printing resolution to avoid conditions of poor performance in an inkjet printing system, the printing system having a base resolution, the method comprising:

selecting a new print resolution higher than the base resolution;

mapping print data from the base resolution to the new resolution, while substantially preserving the optical density of the base resolution; and re-ordering the print data in the new print resolution to avoid conditions of poor performance.

2. The method of adjusting printing resolution to avoid conditions of poor performance in an inkjet printing system of claim 1, wherein the new print resolution is selected based on a factor external to the printing system.

3. The method of adjusting printing resolution to avoid conditions of poor performance in an inkjet printing system of claim 2, wherein the inkjet printing system is an industrial printing system and the factor external to the printing system is the feed rate of a target item.

4. The method of adjusting printing resolution to avoid conditions of poor performance in an inkjet printing system of claim 1, wherein the new print resolution is selected from a list of potential new print resolutions, and wherein the base resolution and potential new print resolutions are multiples of a common print resolution.

5. The method of adjusting printing resolution to avoid conditions of poor performance in an inkjet printing system of claim 4, wherein the base resolution is selected from the group consisting essentially of 300 dots per inch, 600 dots per inch, and 1200 dots per inch.

6. The method of adjusting printing resolution to avoid conditions of poor performance in an inkjet printing system of claim 4, wherein the potential new print resolutions are selected the group consisting essentially of 450 dots per inch, 900 dots per inch, 1800 dots per inch, and 2400 dots per inch.

7. The method of adjusting printing resolution to avoid conditions of poor performance in an inkjet printing system of claim 1, wherein substantially preserving the optical density of the base resolution comprises substantially preserving the total number of ink drops to be fired.

8. The method of adjusting printing resolution to avoid conditions of poor performance in an inkjet printing system of claim 1, wherein re-ordering the print data in the new print resolution to avoid conditions of poor performance comprises ensuring either that successive drops are contiguous, or that at least two non-firing times between drops.

9. The method of adjusting printing resolution to avoid conditions of poor performance in an inkjet printing system of claim 1, wherein the conditions of poor performance result from printhead puddling.

10. A method of adjusting printing resolution to avoid conditions of poor performance in an industrial inkjet printing system due to printhead puddling, the printing system having a base resolution, the method comprising:
  selecting a new print resolution higher than the base resolution, the new resolution and base resolution both multiples of a common base resolution;
  mapping print data from the base resolution to the new resolution, while substantially preserving the optical density of the base resolution by substantially preserving the total number of ink drops to be fired; and
  re-ordering the print data in the new print resolution to avoid conditions of poor performance by ensuring either that successive drops are contiguous, or that at least two non-firing times between drops.

11. An inkjet printing system having a base printing resolution, comprising:
  a printhead;
  a controller, the controller configured to adjust printing resolution to avoid conditions of poor performance of the printhead by:
    selecting a new print resolution higher than the base resolution;
    mapping print data from the base resolution to the new resolution, while substantially preserving the optical density of the base resolution; and
    re-ordering the print data in the new print resolution to avoid conditions of poor performance.

12. The inkjet printing system of claim 11, wherein the new print resolution is selected based on a factor external to the printing system.

13. The inkjet printing system of claim 12, wherein the printing system is an industrial printing system and the factor external to the printing system is the feed rate of a target item.

14. The inkjet printing system of claim 11, wherein the new print resolution is selected from a list of potential new print resolutions, and wherein the base resolution and potential new print resolutions are multiples of a common print resolution.

15. The inkjet printing system of claim 14, wherein the base resolution is selected from the group consisting essentially of 300 dots per inch, 600 dots per inch, and 1200 dots per inch.

16. The inkjet printing system of claim 14, wherein the potential new print resolutions are selected the group consisting essentially of 450 dots per inch, 900 dots per inch, 1800 dots per inch, and 2400 dots per inch.

17. The inkjet printing system of claim 11, wherein substantially preserving the optical density of the base resolution comprises substantially preserving the total number of ink drops to be fired.

18. The inkjet printing system of claim 11, wherein re-ordering the print data in the new print resolution to avoid conditions of poor performance comprises ensuring either that successive drops are contiguous, or that at least two non-firing times between drops.

19. The inkjet printing system of claim 11, wherein the conditions of poor printhead performance result from puddling.

20. An inkjet printing system having a base printing resolution, comprising:
  a printhead;
  a controller, the controller configured to adjust printing resolution to avoid conditions of poor performance of the printhead by:
    selecting a new print resolution higher than the base resolution, the new resolution and base resolution both multiples of a common base resolution;
    mapping print data from the base resolution to the new resolution, while substantially preserving the optical density of the base resolution by substantially preserving the total number of ink drops to be fired; and
    re-ordering the print data in the new print resolution to avoid conditions of poor performance by ensuring either that successive drops are contiguous, or that at least two non-firing times between drops.

21. A method of operating an inkjet pen over a continuous range of scan rates while reducing print quality defects resulting from non-optimum nozzle firing rates, the inkjet pen configured to receive print data representing a sequence of individual drops, the method comprising:
  resealing print data to a higher print resolution, and
  re-ordering the sequence of individual drops to substantially avoid non-optimum nozzle firing rates.

22. The method of claim 21, wherein resealing the print data to a higher print resolution substantially preserves optical density of the print data.

23. The method of claim 22, wherein substantially preserving the optical density is achieved by providing for substantially a same number of individual drops subsequent to rescaling as existed prior to rescaling.

24. The method of claim 21, wherein print quality defects resulting from non-optimum nozzle firing rates occur within a range of disfavored firing rates, and wherein re-ordering the sequence of individual drops to substantially avoid non-optimum nozzle firing rates comprises adjusting time intervals between successive drops such that the inverse of the time intervals are not within the range of disfavored firing rates.

25. The method of claim 24, wherein adjusting time intervals between successive drops comprises adding or omitting non-printing spaces between drops at the higher print resolution.

* * * * *

UNITED STATES PATENT AND TRADEMARK OFFICE
CERTIFICATE OF CORRECTION

PATENT NO. : 7,255,413 B2
APPLICATION NO. : 11/047075
DATED : August 14, 2007
INVENTOR(S) : Santiago Garcia Reyero et al.

It is certified that error appears in the above-identified patent and that said Letters Patent is hereby corrected as shown below:

In column 4, line 16, delete "pudding" and insert -- puddling --, therefor.

In column 4, line 18, delete "pudding" and insert -- puddling --, therefor.

In column 4, line 21, delete "resealed" and insert -- rescaled --, therefor.

In column 4, line 50, delete "resealing" and insert -- rescaling --, therefor.

In column 4, line 65, delete "resealing" and insert -- rescaling --, therefor.

In column 5, line 37, delete "resealing" and insert -- rescaling --, therefor.

In column 5, line 40, delete "resealed" and insert -- rescaled --, therefor.

In column 5, line 45, delete "resealing" and insert -- rescaling --, therefor.

In column 5, line 53, delete "resealing" and insert -- rescaling --, therefor.

In column 7, line 61, in Claim 16, after "selected" insert -- from --.

In column 8, line 37, in Claim 21, delete "resealing" and insert -- rescaling --, therefor.

In column 8, line 40, in Claim 22, delete "resealing" and insert -- rescaling --, therefor.

Signed and Sealed this

Nineteenth Day of August, 2008

JON W. DUDAS
*Director of the United States Patent and Trademark Office*